US008501856B2

(12) United States Patent
Correia et al.

(10) Patent No.: US 8,501,856 B2
(45) Date of Patent: *Aug. 6, 2013

(54) CURABLE SILICON-CONTAINING COMPOSITIONS POSSESSING HIGH TRANSLUCENCY

(75) Inventors: Reuben Correia, Watervliet, NY (US); Abirami Srikanth, Bangalore (IN); Indumathi Ramakrishnan, Bangalore (IN); Shayne Landon, Ballston Lake, NY (US); Vikram Kumar, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/827,945

(22) Filed: Jul. 13, 2007

(65) Prior Publication Data

US 2009/0018260 A1 Jan. 15, 2009

(51) Int. Cl.
*C08K 3/34* (2006.01)
*C08K 3/36* (2006.01)
*C08L 83/04* (2006.01)
*C08L 83/10* (2006.01)

(52) U.S. Cl.
USPC ............ 524/492; 524/493; 524/588; 524/847

(58) Field of Classification Search
USPC .................... 524/492, 493, 588, 847
See application file for complete search history.

(56) References Cited

U.S. PATENT DOCUMENTS

| 3,953,487 | A | | 4/1976 | Kratel et al. | |
| 4,307,023 | A | | 12/1981 | Ettlinger et al. | |
| 4,554,338 | A | | 11/1985 | Wengrovius | |
| 4,956,436 | A | | 9/1990 | Letoffe et al. | |
| 5,013,585 | A | * | 5/1991 | Shimizu et al. | 427/220 |
| 5,213,899 | A | | 5/1993 | Lucas | |
| 5,489,479 | A | | 2/1996 | Lucas et al. | |
| 5,504,147 | A | * | 4/1996 | Fujiki et al. | 524/730 |
| 5,686,054 | A | | 11/1997 | Barthel et al. | |
| 5,985,991 | A | * | 11/1999 | Beljanski et al. | 524/779 |
| 5,990,257 | A | * | 11/1999 | Johnston et al. | 528/28 |
| 6,184,408 | B1 | * | 2/2001 | Burns et al. | 556/450 |
| 6,610,108 | B2 | | 8/2003 | Perry et al. | |
| 6,800,413 | B2 | * | 10/2004 | Barthel et al. | 430/108.3 |
| 7,417,105 | B2 | * | 8/2008 | Landon et al. | 528/34 |
| 2005/0192387 | A1 | * | 9/2005 | Williams et al. | 524/261 |
| 2006/0293480 | A1 | * | 12/2006 | Landon et al. | 528/28 |
| 2007/0116907 | A1 | * | 5/2007 | Landon et al. | 428/34 |
| 2007/0237912 | A1 | * | 10/2007 | Correia | 428/34 |
| 2007/0244249 | A1 | * | 10/2007 | Correia | 524/588 |
| 2008/0242762 | A1 | * | 10/2008 | Ramakrishnan et al. | 523/122 |
| 2008/0242763 | A1 | * | 10/2008 | Ramakrishnan et al. | 523/122 |

FOREIGN PATENT DOCUMENTS

DE 10 2004 010755 A1 9/2005
EP 0 931 800 A 7/1999

OTHER PUBLICATIONS

Blaadern, A. Van, J. Van Geest, and A. Vrij. (Dec. 1992) Monodisperse Colloidal Silica Spheres from Tetraalkoxysilanes: Particle Formation and Growth Mechanism. Journal of Colloid and Interface Science, vol. 154(2), pp. 481-501.*

Floess, J. et al., "The use of vinyl functional aerogels for reinforcement of silicone rubbers", *Journal of Non-Crystalline Solids*, North-Holland Physics Publishing, Amsterdam, NL, Jun. 2001, vol. 284:1-3; pp. 101-108.

* cited by examiner

*Primary Examiner* — Ling Choi
*Assistant Examiner* — Darcy D Laclair Lynx
(74) *Attorney, Agent, or Firm* — Dominick G. Vicari; Kenneth S. Wheelock

(57) ABSTRACT

The invention relates to curable, storage-stable silicon-containing compositions reinforced with functionalized silica useful as one and two-part sealant and adhesive systems. The cured compositions provide silicon-containing rubber having excellent translucency, physical properties and primerless adhesion.

37 Claims, No Drawings

CURABLE SILICON-CONTAINING COMPOSITIONS POSSESSING HIGH TRANSLUCENCY

FIELD OF THE INVENTION

This invention relates to curable, storage-stable silicon-containing compositions which upon curing provide a silicon-containing rubber. More specifically, the present invention relates to functionalized silica reinforced curable diorganopolysiloxane based silicone compositions and/or silylated polyurethane resin based compositions having excellent storage stability, translucency, physical properties and primeness adhesion.

BACKGROUND OF THE INVENTION

Typical sealant compositions which contain silanol-terminated diorganopolysiloxane or silylated polyurethane (SPUR) as base polymer, calcium carbonate as filler, a plasticizer for viscosity control, catalyst, cross-linker and adhesion promoter are inherently opaque. Moreover, fumed silicas are not typically used to any extent with the silanol-terminated diorganopolysiloxane without the polymer being end-capped due to the tendency of the free silanol (—SiOH) groups on the fumed silica to interact with the silanol terminated polymer thereby causing the formulation to increase in viscosity (structuring) during storage. In this regard, the structuring phenomenon limits the utility of fumed silica fillers, in any significant amount, in two-part silanol-terminated diorganopolysiloxane based sealant compositions.

Therefore, a need exists for stable translucent silicone compositions offering rapid primeness bond strength to a wide variety of substrates along with excellent physical properties. The invention disclosed herein provides stable translucent diorganopolysiloxane based silicone compositions and/or silylated polyurethane resin based compositions that are especially suitable as sealants or adhesives where the desired characteristics of high translucency, rapid primeness adhesion, strength and elasticity are important performance criteria.

SUMMARY OF THE INVENTION

In accordance with the present invention, there is provided, a moisture curable silicon-containing resin composition comprising:
  a) at least one silicon-containing resin selected from the group consisting of a diorganopolysiloxane wherein the silicon atom at each polymer chain end of said diorganopolysiloxane is silanol terminated and a silylated resin;
  b) at least one functionalized silica;
  c) at least one catalyst;
  d) at least one crosslinker; and, optionally,
  e) at least one additional component selected from the group consisting of alkyl-terminated diorganopolysiloxane, filler, UV stabilizer, antioxidant, adhesion promoter, cure accelerator, thixotropic agent, plasticizer, polymer endcapping catalyst, moisture scavenger, pigment, dye, surfactant, solvent and biocide.

The present invention is based on the discovery that curable silicon-containing resin compositions containing functionalized silica provide remarkably stable and highly translucent compositions which upon curing provide a silicon-containing rubber offering rapid primerless bond strength to a wide variety of substrates along with excellent physical properties.

DESCRIPTION OF THE INVENTION

We now disclose curable silicon-containing resin compositions that provide highly translucent silicone and silylated polyurethane resin based sealant formulations using functionalized silica made by process more fully described herein below.

The moisture curable silicon-containing resin compositions of the present invention can be prepared for use as one and two-part sealant and adhesive systems known in the art, and provide stable translucent compositions. In the case of the two parts constituting the curable composition, respectively, the "first part" and the "second part," while separated from each other exhibit storage stability of an indefinite duration but once combined, undergo rapid cure to provide the silicon-containing rubber herein.

The silicon-containing resin of the present invention is selected from the group consisting of a diorganopolysiloxane polymer wherein the silicon atom at each polymer chain end is silanol terminated and/or a silylated resin, e.g., silylated polyol optionally containing at least two urethane linkages.

Silylated polyol is a polyol compound of which at least one of the hydroxy groups is silylated. Silylated polyols containing at least two urethane linkages, i.e., silylated polyurethanes, are known materials and in general can be obtained by (a) reacting an isocyanate-terminated polyurethane (PU) prepolymer with a suitable silane, e.g., one possessing both hydrolyzable functionality, specifically, one to three alkoxy groups for each silicon atom, and active hydrogen functionality, e.g., mercapto, primary amine and, advantageously, secondary amine, which is reactive for isocyanate, or by (b) reacting a hydroxyl-terminated PU prepolymer with a suitable isocyanate-terminated silane, e.g., one possessing one to three alkoxy groups.

Isocyanate-terminated PU prepolymers are obtained by reacting one or more polyols, advantageously, diols, with one or more polyisocyanates, advantageously, diisocyanates, in such proportions that the resulting prepolymers will be terminated with isocyanate. In the case of reacting a diol with a diisocyanate, a molar excess of diisocyanate will be employed.

Included among the polyols that can be utilized for the preparation of the isocyanate-terminated PU prepolymer are polyether polyols, polyester polyols such as the hydroxyl-terminated polycaprolactones, polyetherester polyols such as those obtained from the reaction of polyether polyol with e-caprolactone, polyesterether polyols such as those obtained from the reaction of hydroxyl-terminated polycaprolactones with one or more alkylene oxides such as ethylene oxide and propylene oxide, hydroxyl-terminated polybutadienes, and the like.

Specific suitable polyols include the poly(oxyalkylene) ether diols (i.e., polyether diols), in particular, the poly(oxyethylene)ether diols, the poly(oxypropylene)ether diols and the poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, and the like. In one embodiment of the present invention, the polyols used in the production of silylated polyol optionally containing at least two urethane linkages are poly(oxyethylene)ether diols with equivalent weights between about 500 and 25,000. In another embodiment of the present invention, the polyols used in the production of silylated polyol optionally containing at least two urethane linkages are poly(oxypropylene)ether diols with equivalent weights between about 1,000 to 20,000. Mixtures of polyols of various structures, molecular weights and/or functionalities can also be used.

The polyether polyols can have a functionality up to about 8 but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight of from about 1,000 to about 25,000, more preferably from about 2,000 to about 20,000, and even more preferably from about 4,000 to about 18,000. Examples of commercially available diols that are suitable for making the isocyanate-terminated PU prepolymer include ARCOL R-1819 (number average molecular weight of 8,000), E-2204 (number average molecular weight of 4,000), and ARCOL E-2211 (number average molecular weight of 11,000).

Any of numerous polyisocyanates, advantageously, diisocyanates, and mixtures thereof, can be used to provide the isocyanate-terminated PU prepolymers. In one embodiment, the polyisocyanate can be diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, isophorone diisocyanate, dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reaction with the isocyanate-terminated PUR prepolymers described above must contain functionality that is reactive with isocyanate and at least one readily hydrolyzable and subsequently crosslinkable group, e.g., alkoxy. Particularly useful silylation reactants are the silanes of the general formula:

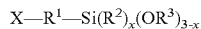

$$X—R^1—Si(R^2)_x(OR^3)_{3-x}$$

wherein X is an active hydrogen-containing group that is reactive for isocyanate, e.g., —SH or —NHR$^4$ in which R$^4$ is H, a monovalent hydrocarbon group of up to 8 carbon atoms or —R$^5$—Si(R$^6$)$_y$(OR$^7$)$_{3-y}$, R$^1$ and R$^5$ each is the same or different divalent hydrocarbon group of up to 12 carbon atoms, optionally containing one or more heteroatoms, each R$^2$ and R$^6$ is the same or different monovalent hydrocarbon group of up to 8 carbon atoms, each R$^3$ and R$^7$ is the same or different alkyl group of up to 6 carbon atoms and x and y each, independently, is 0, 1 or 2.

Specific silanes for use herein include the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethyiphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethylbutyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

A catalyst will ordinarily be used in the preparation of the isocyanate-terminated PU prepolymers. Advantageously, condensation catalysts are employed since these will also catalyze the cure (hydrolysis followed by crosslinking) of the SPU-resin component of the curable compositions of the invention. Suitable condensation catalysts include the dialkyltin dicarboxylates such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium-containing and bismuth-containing complexes such as KAT XC6212, K-KAT XC-A209 and K-KAT 348, supplied by King Industries, Inc., aluminum chelates such as the TYZER® types, available from DuPont company, and the KR types, available from Kenrich Petrochemical, Inc., and other organometallic catalysts, e.g., those containing a metal such as Zn, Co, Ni, Fe, and the like.

Silylated polyurethane (SPU) resins can be obtained by reacting a hydroxyl-terminated PU prepolymer with an isocyanatosilane. The hydroxyl-terminated PU prepolymer can be obtained in substantially the same manner employing substantially the same materials, i.e., polyols, polyisocyanates and optional catalysts (preferably condensation catalysts), described above for the preparation of isocyanate-terminated PU prepolymers the one major difference being that the proportions of polyol and polyisocyanate will be such as to result in hydroxyl-termination in the resulting prepolymer. Thus, e.g., in the case of a diol and a diisocyanate, a molar excess of the former will be used thereby resulting in hydroxyl-terminated PU prepolymer.

Useful silylation reactants for the hydroxyl-terminated SPU resins are those containing isocyanate termination and readily hydrolizable functionality, e.g., 1 to 3 alkoxy groups. Suitable silylating reactants are the isocyanatosilanes of the general formula:

$$OCN-R^4-Si(OR^5)_{3-y}(R^6)_y$$

wherein $R^4$ is an alkylene group of up to 12 carbon atoms, optionally containing one or more heteroatoms, each $R^6$ is the same or different alkyl or aryl group of up to 8 carbon atoms, each $R^5$ is the same or different alkyl group of up to 6 carbon atoms and y is 0, 1 or 2. In one embodiment, $R^4$ possesses 1 to 4 carbon atoms, each $R^5$ is the same or different methyl, ethyl, propyl or isopropyl group and y is 0.

Specific isocyanatosilanes that can be used herein to react with the foregoing hydroxyl-terminated PU prepolymers to provide moisture-curable SPU resins include isocyanatopropyltrimethoxysilane, isocyanatoisopropyl trimethoxysilane, isocyanato-n-butyltrimethoxysilane, isocyanato-t-butyltrimethoxysilane, isocyanatopropyltriethoxysilane, isocyanatoisopropyltriethoxysilane, isocyanato-n-butyltriethoxysilane, isocyanato-t-butyltriethoxysilane, and the like.

In addition to preparing silylated polyurethane resins (SPUR) from —NCO or —OH terminated polyurethane prepolymer, as described herein above, silylated polyurethane resin can be obtained from the direct reaction of a diol (—OH terminated) with an isocyanatosilane. In this manner of preparing SPUR there is no initial formation of the polyurethane prepolymer simply the direct reaction of the diol with the silane.

Suitable diols for preparing SPUR include those already describe herein. Suitable isocyanatosilane for the preparing SPUR include but are not limited to 3-isocyanatopropylmethyldimethoxysilane, 3-isocyanatopropyltrimethoxysilane and 3-isocyanatopropyltriethoxysilane. A suitable isocyanatosilane is available from GE Silicones under the designation A Link-35. The aminosilanes can be, for example, selected from the group consisting of 4-amino-3,3-dimethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane and aminoisopropoxyethyltriethoxysilane The level of incorporation of the silylated resin ranges from about 5 weight % to about 95 weight %, more preferably from about 35 weight % to about 85 weight % of the total composition.

The silicon-containing diorganopolysiloxane of the present invention, wherein the silicon atom at each polymer chain end is silanol terminated has the general formula:

$$M_aD_bD'_c$$

wherein the subscript a equals 2 and b is equal to or greater than 1 and the subscript c is zero or positive;

$$M=(HO)_{3-x-y}R^7_xR^8_ySiO_{1/2};$$

wherein the subscript x equals 0, 1 or 2 and y is either 0 or 1, with the proviso that x+y is less than or equal to 2, $R^7$ and $R^8$ are independent monovalent hydrocarbon radicals containing from 1 to about 60 carbon atoms;

$$D=R^9R^{10}SiO_{1/2};$$

wherein $R^9$ and $R^{10}$ are independent monovalent hydrocarbon radicals containing from 1 to about 60 carbon atoms; and, $$D'=R^{11}R^{12}SiO_{2/2};$$

wherein $R^{11}$ and $R^{12}$ are independent monovalent hydrocarbon radicals containing from 1 to about 60 carbon atoms.

The level of incorporation of the diorganopolysiloxane wherein the silicon atom at each polymer chain end is silanol terminated ranges from about 5 weight % to about 95 weight %, more preferably from about 35 weight % to about 85 weight %, and most preferably from about 50 weight % to about 70 weight % of the total composition.

According to one embodiment of the present invention, the viscosity of the diorganopolysiloxane wherein the silicon atom at each polymer chain end is silanol terminated is from about 1,000 to about 200,000 cps at 25° C.

The functionalized silica of the present invention is prepared by a procedure as follows. An aqueous alcoholic solution, a catalyst, and a first portion of a first organosilicon functionalizing agent are mixed together to form a first reaction mixture. Alcohols that can be used to prepare the aqueous alcoholic solution include water-miscible alcohols, such as methanol, ethanol, n-propanol, and iso-propanol. The first reaction mixture is mixed with a tetraalkoxysilane at a controlled rate to form a second reaction mixture comprising a sol gel silica; and then, further reacting the second reaction mixture with a mixture of a second portion of the first organosilicon functionalizing agent and a second organosilicon functionalizing agent to functionalize the sol gel silica to form the functionalized silica.

The first organosilicon functionalizing agent comprises a halosilane, an organosilane having at least one silanol group and/or an alkoxy group, an aryloxy group, or a cycloalkoxy group; an organosilazane, a cyclic organosiloxane, a low-viscosity polyorganosiloxane that has a silanol group and/or an alkoxy group, an aryloxy group, or a cycloalkoxy group, or a silicone resin that has a silanol group and/or an alkoxy group, an aryloxy group, or a cycloalkoxy group. Examples of alkoxy groups include those groups having 1 to 6 carbon atoms, examples of aryloxy groups include groups having 6 to 10 carbon atoms, and examples of cycloalkoxy groups include groups having 6 to 10 carbon atoms. In an embodiment, the first organosilicon functionalizing agent is selected from the group consisting of a silanol-stopped polydimethylsiloxane, octaphenylcyclotetrasiloxane, octamethylcyclotetrasiloxane ($D_4$) and hexamethyldisilazane (HMDZ). Other examples of the first organosilicon functionalizing agent include diphenylsilanediol, dimethylsilanediol, methyltriethoxysilane, and phenyltrimethoxysilane. The low-viscosity polyorganosiloxane may contain one or more kinds of organic groups selected from the group consisting of a methyl group, a phenyl group, a vinyl group, and a 3,3,3-trifluoropropyl group. Suitable low-viscosity polyorganosiloxanes have a viscosity, as measured at 25° C., in a range of from about 1 to about 300 centipoises in an embodiment, and from about 5 to about 100 centipoises in another embodiment. Examples of the halosilanes include halotrialkylsilanes, such as chlorotrimethylsilane; halotriarylsilanes, such as chlorotriphenylsilane; dichlorodimethylsilane, bis(chlorodimethylsilyl)methane, trichloromethylsilane, bromotrimethylsilane, and the like.

The first reaction mixture is then reacted with a tetraalkoxysilane at a controlled rate to form a second reaction mixture comprising a sol gel silica. The reaction can be carried out by adding the tetraalkoxysilane to the first reaction mixture at a rate so as to maintain the reaction temperature in a range from about 40° C. to about the reflux temperature. In an embodiment, the reaction temperature is maintained in a range from about 40° C. to 100° C. In another embodiment, the reaction temperature is maintained from about 50° C. to about 70° C. The addition of the tetraalkoxysilane is also controlled such that during this step, the mole ratio of the tetraalkoxysilane to the first portion of the first organosilicon functionalizing agent is in a relative mole ratio of from 1:0.2 to about 1:0.6, respectively. Further, without being bound by any theory, it is believed that a controlled rate of addition of the tetraalkoxysilane enables a controlled growth in the size and surface area of the sol gel silica thus produced.

Next, the second reaction mixture comprising the sol gel silica is further reacted with a mixture comprising a second portion of the first organosilicon functionalizing agent and a second organosilicon functionalizing agent. In this step, the sol gel silica is functionalized, wherein the first and the second organosilicon functionalizing agents react with the surface hydroxyl groups on the sol gel silica.

The second organosilicon functionalizing agent comprises a halosilane, an organosilane having at least one silanol group and/or an alkoxy group, an aryloxy group, or a cycloalkoxy group; an organosilazane, a cyclic organosiloxane, a low-viscosity polyorganosiloxane that has a silanol group and/or an alkoxy group, an aryloxy group, or a cycloalkoxy group, or a silicone resin that has a silanol group and/or an alkoxy group, an aryloxy group, or a cycloalkoxy group. In an embodiment, the second organosilicon functionalizing agent comprises at least one organosilicon compound comprising at least one alkenyl group, defined and exemplified as previously described. In another embodiment, the second organosilicon functionalizing agent comprises at least one organosilicon compound comprising one silicon atom having two alkenyl groups bonded to it. In still another embodiment, compounds having two silicon atoms, each of which has one alkenyl group bonded to it can also function as the second organosilicon functionalizing agent. Suitable classes of organosilicon compounds comprising at least one alkenyl group include halodivinylsilanes, dialkyldivinylsilanes, diaryldivinylsilanes, dicycloalkyldivinylsilanes, alkylaryldivinylsilanes, alkoxysilanes, such as for example, (trialkoxy)vinylsilanes; (dialkenyl)silazanes, such as the dialkenyl(tetraalkyl)disilazanes, exemplified by divinyl(tetramethyl)disilazane, (tetraphenyl)(divinyl)disilazane, and the like; cyclic organoalkenylsiloxanes, such as tetramethyltetravinylcyclotetrasiloxane; low-viscosity vinyl-capped polyorganosiloxanes, such as for example, a divinyl-terminated polydimethylsiloxane-polydiphenylsiloxane copolymer having an 84:16 mole ratio of dimethylsiloxane and diphenylsiloxane and a viscosity of about 500 centistokes (available from Aldrich Chemical Company); or a vinyl-capped silicone resin, such as for example, vinyl-capped polydimethylsiloxane having a viscosity from about 850-1150 centistokes (available from Aldrich Chemical Company). Additional examples of cyclic siloxanes can be found in commonly assigned U.S. Pat. No. 6,610,108, published on Aug. 26, 2003, which is herein incorporated in its entirety. Further, each of these classes of compounds may additionally comprise a silanol group and/or an alkoxy group, an aryloxy group, or a cycloalkoxy group. In a particular embodiment, the second organosilicon functionalizing agent comprises divinyl(tetramethyl)disilazane.

The process for producing the functionalized silica further comprises adjusting the relative mole ratio of the first and the second portions of the first organosilicon functionalizing agent. Without being bound by theory, it is believed that the amount of the first portion of the organosilicon functionalizing agent governs the particle size (abbreviated as PS) of the sol gel silica formed in the second step reaction with the tetraalkoxysilane (discussed previously), and the amount of the second portion of the first organosilicon functionalizing agent governs the viscosity of the curable silicone resin, whose preparation is discussed further below in the present disclosure. In an embodiment, the relative mole ratio of the first portion and the second portion of the first organosilicon functionalizing agent can be from about 1:0.5 to about 1:1, respectively. When greater than about 1 mole of the second portion, relative to one mole of the first portion is used, the final cured silicone resin composition generally has less desirable mechanical properties, such as modulus. When less than about 0.5 mole of the second portion, relative to one mole of the first portion is used, gel formation occurs in the final cured silicone resin composition, thereby affecting properties such as transparency and mechanical properties.

Furthermore, the process for producing the functionalized silica further comprises adjusting a relative mole ratio of the tetraalkoxysilane and the first portion of the first organosilicon functionalizing agent. In an embodiment, the relative mole ratio is from about 1:0.2 to about 1:0.6, respectively. When the amount of the first portion of the first organosilicon functionalizing agent is less than 0.2 mole, relative one mole of the tetraalkoxysilane, the resulting functionalized silica particles have an undesirably large particle size that can be generally greater than 30 nanometers, sometimes greater than 50 nanometers. When the amount of the first portion of the first organosilicon functionalizing agent is greater than 0.6 mole, relative to one mole of the tetraalkoxysilane, the resulting functionalized silica generally comprises a collapsed silica network with very little or no formation of discrete particles. The morphology of the silica particles can be studied using TEM (transmission electron microscopy).

The functionalization of the sol gel silica occurs by reaction of the surface hydroxyl groups present in the sol gel silica (formed as described previously) with the second portion of the first organosilicon functionalization agent and the second organosilicon functionalizing agent. The process is also referred to as a hydrophobizing step, whereby the polar silanol hydroxyl groups are converted into hydrophobic groups, such as trialkylsiloxy groups. Such reactions can assist in preventing a subsequent condensation reaction among the sol gel silica particles. Further, in order to prepare low viscosity curable silicone rubber compositions, as discussed further below in the present disclosure, such reactions also assist in minimizing interactions between the functionalized silica particles and the silicone polymer, thereby minimizing creep hardening, and improving shelf-life of these curable formulations.

The type of catalyst to be used in preparing the functionalized silica depends upon the type of the first and the second organosilicon functionalizing agents used. For example, when a halotrialkylsilane is used as the first organosilicon functionalizing agent, and a (dialkenyl)halosilane or a (monoalkenyl)halosilane is used as the second organosilicon functionalizing agent, an acid catalyst or a neutral catalyst can be used, since the halosilane upon hydrolysis produces acidic hydrogen halide. Examples of the acid catalyst include aqueous mineral acids, such as hydrochloric acid. Neutral catalysts include water or water-alcohol mixtures can also be used. But, when the first and the second organosilicon functionalizing agents are a silazane compound, such as for example, hexamethyldisilazane and (divinyl)(tetramethyl)disilazane (abbreviated as DVTMDZ), respectively, a base catalyst or a neutral catalyst is used. Base catalysts known in the art can be used. An exemplary base catalyst is aqueous ammonia.

After forming the functionalized silica particles in the aqueous alcoholic medium, the resulting product mixture is generally aged by being allowed to stand for a period of time at ambient temperature. The aging period can range from a minimum of about 1 hour to about 15 hours. Generally, the aging period ranges from about 4 hours to about 6 hours.

Next, the aged product mixture is treated with a solvent or mixture of solvents, and heated to remove the water. Solvents that can be used include hydrocarbons, liquid carbon dioxide, and ionic liquids. Some examples of ionic liquids are the imidazolium salts and the pyridinium salts, such as for example, 1-hexyl-3-alkylimidazolium chloride, 1-hexyl-3-alkylimidazolium iodide, 1-hexyl-3-alkylimidazolium hexafluorophosphate, 1-hexyl-3-alkylimidazolium hexafluorophosphate, 1-butyl-3-methylimidazolium octyl sulfate, 1-butyl-3-methylimidazolium 2-(2-methoxyethoxy)ethyl sulfate, 1-ethyl-3-methylimidazolium tosylate, 1-methyl-3-octylimidazolium chloride, and 1-Butyl-4-methylpyridinium tetrafluoroborate. Suitable solvents include those that can form an azeotrope with water, and those that do not. When a solvent that does not form an azeotrope with water is used, it is usually a higher boiling solvent such that water can be removed by fractional distillation. Any hydrocarbon solvent can be used. When a hydrocarbon solvent is used, it can be chosen so as to remove water as an azeotrope. In an embodiment, hydrocarbon solvents having a boiling point higher than that of water and the alcohol comprising the aqueous alcoholic reaction medium can be used. In another embodiment, hydrocarbon solvents having a lower boiling point, but which can form azeotropes with the water and the alcohol can be used. Xylene is an exemplary solvent since it has a higher boiling point than that of water and an aliphatic alcohol, such as ethanol; and it forms an azeotrope with water, thereby facilitating removal of all the water. Other non-limiting examples of suitable hydrocarbon solvents include toluene, cyclohexane, heptane, octane, and iso-octane and isododecanol. Silicone based monomers such as $D_3$, $D_4$, $D_5$, and MM, wherein D is $(CH_3)_2Si$—$O_{2/2}$, and M is $(CH_3)_3Si$—$O_{1/2}$, as well as diorganopolysiloxanes and typical plasticizers used in sealants and/or adhesives can also be used as solvents.

After the removal of water, a suspension of the functionalized silica in the solvent is obtained which may contain trace levels of water and/or the alcohol. The suspension of the functionalized silica in the solvent has a high transparency of greater than about 90 percent transmittance over a wavelength range of 350 nanometers to 800 nanometers, as measured by UV-visible spectroscopy on a 0.1 weight percent suspension of the functionalized silica in xylene solvent. Further, the functionalized silica has a particle size in a range from about 4 nanometers to about 1000 nanometers with a mean particle size from about 50 nanometers to about 150 nanometers in an embodiment, and a mean particle size from about 80 nanometers to about 120 nanometers in another embodiment. On a dry basis, the functionalized silica can have a concentration of between about 8 to about 2 available silanol hydroxyl groups per square nanometer of the silica in an embodiment, and between about 7 to about 3 silanol hydroxyl groups per square nanometer of filler in another embodiment. The functionalized silica has a BET surface area of 100 meters square per gram to about 1000 meters square per gram in an embodiment, from 200 to 800 meters square per gram in another embodiment, and from 250 to 600 meters square per gram in still another embodiment.

In the preparation of the curable silicon-containing resin compositions, the amount of the functionalized silica on a dry basis can be from about 5 to about 80 parts by weight in an embodiment, from about 10 to about 30 parts by weight in another embodiment, per 100 parts by weight of the total silicon-containing resin composition.

Catalysts useful in the preparation of the presently claimed moisture curable silicon-containing resin composition can be any of those known to be useful for facilitating condensation and/or crosslinking in silicon-containing sealant compositions. The condensation catalyst may include metal and non-metal catalysts. Examples of the metal portion of the metal condensation catalysts useful in the present invention include tin, titanium, zirconium, lead, iron, cobalt, antimony, manganese, bismuth and zinc compounds.

Tin compounds useful for facilitating crosslinking in the present invention include: tin compounds such as dibutyltindilaurate, dibutyltindiacetate, dibutyltindimethoxide, tinoctoate, isobutyltintriceroate, dibutyltinoxide, dibutyltin bis-isooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate. In one embodiment, tin compounds and $(C_8H_{17})_2SnO$ dissolved in $(n-C_3H_9O)_4Si$ are used. In another embodiment, diorganotin bis β-diketonates are used. Other examples of tin compounds may be found in U.S. Pat. Nos. 5,213,899, 4,554,338, 4,956,436, and 5,489,479, the teachings of which are herewith and hereby specifically incorporated by reference. In yet another embodiment, chelated titanium compounds, for example, 1,3-propanedioxytitanium bis(ethylacetoacetate); di-isopropoxytitanium bis (ethylacetoacetate); and tetra-alkyl titanates, for example, tetra n-butyl titanate and tetra-isopropyl titanate, are used.

The level of incorporation of the condensation catalyst ranges from about 0.001 weight % to about 5 weight %, more preferably from about 0.003 weight % to about 2.0 weight %, and most preferably from about 0.005 weight % to about 0.5 weight % of the total composition.

The organosilicon crosslinker of the present invention is a compound having one or more leaving groups (i.e., groups that can be easily hydrolyzed), for example, alkoxy, acetoxy, acetamido, ketoxime, benzamido and aminoxy. The crosslinker for use in preparation of the curable silicon-containing resin composition of the invention can be an alkylsilicate. The alkylsilicate has the general formula:

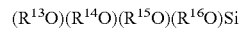

$(R^{13}O)(R^{14}O)(R^{15}O)(R^{16}O)Si$ wherein $R^{13}$, $R^{14}$, $R^{15}$ and $R^{16}$ are independently chosen monovalent hydrocarbon radicals containing from 1 to about 60 carbons. The crosslinker ranges in amount from about 0.01 weight % to about 20 weight %, more preferably from about 0.3 weight % to about 5 weight %, and most preferably from about 0.5 weight % to about 1.5 weight % of the total composition.

Crosslinkers useful herein include tetra-N-propylsilicate (NPS), tetraethylorthosilicate, methytrimethoxysilane and similar alkyl substituted alkoxysilane compositions, methyltriacetoxysilane, dibutoxydiacetoxysilane, methylisopropoxydiacetoxysilane, methyloximinosilane and the like.

Optionally, the curable silicon-containing resin compositions can contain one or more additional ingredients, e.g., alkyl-terminated diorganopolysiloxane, filler, UV stabilizer, antioxidant, adhesion promoter, cure accelerator, thixotropic agent, plasticizer, polymer endcapping catalyst, moisture scavenger, pigment, dye, surfactant, solvent and biocide in known quantities.

The curable silicon-containing resin compositions of the invention can be prepared by known and conventional means, such as, for example, a batch or continuous process.

The previously described embodiments are useful for producing curable silicon-containing compositions, which can be further cured to produce articles having a high transparency of greater than 90 percent transmittance in one embodiment. The present disclosure may be understood more readily by reference to the following examples included herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The following ingredients, as described herein below, were used to prepare Examples 1, 2 and 3.

The treated fumed silica used in Comparative Example 1 in Tables 1 and 2 is available from Degussa as Aerosil R972.

Polymer 1 is a mixture of polydimethylsiloxanes endblocked with hydroxyl groups (available from Momentive Performance Materials).

Plasticizer is polydimethylsiloxanes endblocked with trimethylsilyl groups and having a viscosity of approximately 100 cps (available from Momentive Performance Materials).

Rheology additive is polyalkyleneoxide modified organosilicone co-polymer having a viscosity of about 100 to about 3000 centipoise at 25C (available from Momentive Performance Materials).

Polymer 2 is a polydimethylsiloxanes endblocked with trimethylsilyl groups and having a viscosity of approximately 10,000 cps (available from Momentive Performance Materials).

Filler 1 is octamethylcyclotetrasiloxane treated fumed silica filler with a surface area of approximately 200±/−20 $m^2/g$ (manufactured by Momentive Performance Materials).

Adhesion promoter 1 is aminoethylaminopropyltrimethoxysilane (available from Momentive Performance Materials as Silquest A-1120 silane).

Adhesion promoter 2 is 1,3,5-tris(trimethoxysilylpropyl)isocyanurate (available from Momentive Performance Materials as A-Link 597 silane).

NPS is tetra-N-propylsilicate (available from Degussa).

Catalyst used for condensation and/or crosslinking is dibutyltin bis-isooctylphthalate (available from Momentive Performance Materials).

Example 1

The present invention discloses the preparation of translucent silicone and silylated polyurethane resin (SPUR) based sealant formulations using functionalized silica made by Sol Gel process as described herein below.

Procedure for preparing functionalized silica: Into a three-necked round-bottomed flask equipped with a mechanical stirrer and heated with an oil bath maintained at 67° C. was taken ethanol (250 milliliters), 25 weight percent aqueous ammonia solution (53 milliliters), water (15 milliliters), followed by HMDZ(15.6 milliliters). After the addition of HMDZ, the contents of the reaction flask was mixed for 8 minutes. Then TEOS was added at the rate of 7 milliliters per minute by using a peristaltic pump. After 120 milliliters of TEOS had been added, the resulting reaction mixture was stirred for 30 minutes. Then a mixture of HMDZ (15 milliliters) and 1,3-divinyl-1,1,3,3-tetramethyldisilazane (DVT-MDZ, 0.3 milliliters) was added to the reaction mixture at the rate of 4 milliliters per minute. After the addition, the resulting mixture was heated under reflux for about 1.5 hours. Then the heating was stopped, and the resulting mixture was stirred overnight while being allowed to cool to ambient temperature. This step is sometimes referred to as an "aging" step. Next, the mixture was treated with 200 milliliters of xylene, and the mixture was heated until about 250 milliliters of a distillate had been collected. During the distillation, almost all of the ethanol and ammonia was removed and the pH of the contents in the distillation flask was about 7. The material in the reaction flask contained a suspension of the desired functionalized silica in xylene. The color of the suspension varied from a milky colloid to a water clear transparent liquid.

Incorporation of functionalized silica in a diorganopolysiloxane based formulation: Functionalized silica (20 g) in xylene is mixed with 80 g of silanol polymer (3000 cps). The mixture was taken in a Ross Mixer and heated to 80° C. under vacuum to remove xylene while dispersing the silica in silanol polymer. The rheology data of functionalized silica filled silanol polymer Example 1 and Comparative Example 1, i.e., treated fumed silica filled silanol polymer, prior to curing, was determined by measuring their viscosity (Pas) on the same day that they were prepared using Ares Rheograph as per ASTM D4440 as displayed in Table 1. Example 1 demonstrated a remarkably low thickening effect compared to Comparative Example 1.

TABLE 1

|  | Viscosity (Pas) |
| --- | --- |
| Control (3000 cps silanol polymer) | 3 |
| Comparative Example 1: 20 wt % treated fumed silica in silanol (3000 cps) | 137 |
| Example 1 (prior to curing step): 20 wt % functionalized silica in silanol (3000 cps) | 39 |

Curing: 1 g of n-propyl silicate was added to 25 g of a mixture of functionalized silica in silanol polymer, and then 50 micro L of dibutyl tinoxide was added and mixed in a Hauschild speed mixer at 800 rpm for one minute. Removal of air bubbles using vacuum. The catalyzed mixture was then poured into a Teflon mould and kept under ambient conditions for 24 hours to provide the transparency data presented in Table 2. The transparency data was determined by measuring the transmittance (%) of a cured sheet made as per ASTM D412 (cured for 24 hours) using a BYK Gardner Haze-gard Plus instrument.

TABLE 2

|  | % Transmittance | St.dev | % Haze | St. dev |
| --- | --- | --- | --- | --- |
| Silanol sheet (control) | 95.4 | 0.05 | 1.3 | 0.1 |
| Comparative Example 1: 20 wt % treated fumed silica in silanol (3000 cps) | sheet could not be made due to high viscosity | | | |
| Example 1: 20 wt % functionalized silica in silanol (3000 cps) | 91.2 | 0.3 | 4.7 | 0.3 |

Example 2, as present in Table 3, illustrates a first part preparation of a translucent functionalized silica/silanol terminated polymer based two-part composition.

TABLE 3

| Ingredients (weight %) | Example 2 |
|---|---|
| Polymer 1 | 65.3 |
| Functionalized silica | 15 |
| Plasticizer | 19 |
| Rheology additive | 0.7 |

The stability (rate of increase in viscosity) of Example 2 was determined by storing it in disposable polyethylene cartridges (Semco #250-06, 6 fluid oz. capacity) and measuring over time the Application Rates using WPSTM test E-56 at a temperature of 73° F. and relative humidity (RH) of 50%. In all instances, the Application Rate data was generated using the Semco #250-06 cartridge with its corresponding plunger and a 250 #440 Semco nozzle having an orifice of 0.125 inches. The samples were extruded using a sealant gun and compressed air or nitrogen at 90 psi. The reported Application Rate value was the weight of the formulation that was extruded in 1 minute. The results are presented in Table 4.

TABLE 4

| Time | Example 2 (Application Rate in grams/minute) |
|---|---|
| 7 days | 486 |
| 1 month | 447 |
| 2 months | 493 |
| 3 months | 379 |
| 4 months | 430 |

Significantly, Example 2 demonstrated exceptional Application Rates from 7 days to 4 months. In addition, Example 2 was still extrudable at 4 months enabling this formulation to be converted into a practical (stable) two-part translucent functionalized silica/silanol terminated polymer based sealant.

Example 2 was used as the first part of the two-part translucent sealant composition of Example 3. See Table 5.

TABLE 5

| Example 2 (First part of two-part sealant) Second Part of two-part sealant Ingredients (weight %) | Example 3 (Two-part sealant composition) |
|---|---|
| Polymer 2 | 55.45 |
| Filler 1 | 12 |
| Adhesion promoter 1 | 16 |
| Adhesion promoter 2 | 4 |
| NPS | 11.6 |
| Catalyst | 0.95 |

The first and second part of Example 3 were mixed at a 10:1 (first part/second part) weight ratio to provide the physical properties at full cure (7 days) listed in Table 6. The physical properties of Example 3 were tested as per the ASTM test methods listed in Table 6. The translucency of the sealant was determined by measuring the transmittance (%) of a sheet of sealant made as per ASTM D412 (cured for 7 days) using a BYK Gardner Haze-gard Plus instrument.

TABLE 6

| | Example 3 |
|---|---|
| Tensile (psi), ASTM D412 | 229 |
| Elongation (%), ASTM D412 | 255 |
| 100% Modulus (psi), ASTM D412 | 108 |
| Shore A Hardness, ASTM D2240 | 29 |
| Transmittance (%) | 83 |

In addition to physical properties, Example 3 was tested for its primeness adhesive strength and adhesion properties. This primeness adhesion data of Example 3 is presented in Table 7 and was obtained using lap shear adhesion as measured by WPSTM test C-1221. In all instances, the lap shear adhesion data was generated using test panels comprising vinyl-glass combinations. The panels were prepared using 1 inch wide coupons overlapping ½ inch using 1/16 inch of sealant in a vinyl to glass configuration. The samples were cured under 50% RH and 73° F.

TABLE 7

| | Example 3 | | | |
|---|---|---|---|---|
| Time | Vinyl 1 (psi) | Cohesive Failure (%) | Vinyl 2 (psi) | Cohesive Failure (%) |
| 1 day | 77 | 100 | 69 | 100 |
| 7 days | 111 | 100 | 106 | 100 |

The primeness adhesion data was measured by lap shear as determined by the following procedure: The surfaces of all substrates (glass & vinyl) were cleaned prior to preparation of the lap shear test coupon. All substrates were cleaned using a soap (Ajax® Dish Liquid) and water solution. After cleaning, the surfaces of the substrates were immediately wiped dry with a clean Kimwipe®. The test specimens measuring 1 inch by 3 inches, were prepared using a jig assembly in order to ensure the reproducibility of the bond line thickness (1/16 of an inch) and overlap (0.50 inches) of the lap shear test specimen. The test specimens were cured under standard conditions (25° C. and 50% Relative Humidity) for the time specified. Performance measurements were obtained using a standard tensile tester. Each test specimen was pulled (at a crosshead speed of 0.5 in. per minute) to failure. The lap shear strength (psi) was calculated in accordance with the following formula:

$$\text{Lap Shear Strength}(psi) = \frac{\text{Peak load (lb.)}}{\text{Bonded Area (sq. in.)}}$$

In addition to physical properties, Example 3 of the present invention also demonstrated excellent primerless adhesion between vinyl (plastic) and glass represented by the data displayed in Table 7, supra.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

The invention claimed is:

1. A moisture curable silicon-containing resin composition which is curable to form a translucent cured composition said moisture curable composition comprising:
    a) at least one silicon-containing resin selected from the group consisting of a diorganopolysiloxane wherein the silicon atom at each polymer chain end of said diorganopolysiloxane is silanol terminated and a silylated resin;
    b) at least one hydrophobic functionalized sol gel silica obtained by the process comprising:
        i) mixing an aqueous alcoholic solution and a functionalized silica-preparing catalyst with a first portion of a first organosilicon functionalizing agent to form a first reaction mixture;
        ii) reacting said first reaction mixture with a tetraalkoxysilane at a controlled rate to form a second reaction mixture comprising a sol gel silica, wherein the relative mole ratio of tetralkoxysilane to the first portion of first organosilicon functionalizing agent is from about 1:0.2 to about 1:0.6; and
        iii) further reacting said second reaction mixture with a mixture of a second portion of said first organosilicon functionalizing agent, wherein the relative mole ratio of the first portion of the first organosilicon functionalizing agent to the second portion of the first organosilicon functionalizing agent is from about 1:0.5 to about 1:1, and a second organosilicon functionalizing agent to functionalize the sol gel silica to form said functionalized sol gel silica,
    wherein the functionalized silica results in a lower viscosity of the combined silicon-containing resin and functionalized sol gel silica than the viscosity of a silicon-containing resin which is combined with a treated fumed silica;
    c) at least one condensation and/or crosslinking-facilitating catalyst;
    d) at least one crosslinker; and, optionally,
    e) at least one additional component selected from the group consisting of alkyl-terminated diorganopolysiloxane, filler, UV stabilizer, antioxidant, adhesion promoter, cure accelerator, thixotropic agent, plasticizer, polymer endcapping catalyst, moisture scavenger, pigment, dye, surfactant, solvent and biocide.

2. The silicon-containing resin composition of claim 1 wherein the silylated resin is a silylated polyether.

3. The silicon-containing resin composition of claim 1 wherein the silylated resin is a silylated polyether diol.

4. The silicon-containing resin composition of claim 1 wherein the silylated resin is a silylated polyurethane.

5. The silicon-containing resin composition of claim 1 wherein the silylated resin is a silylated polyurethane obtained from a polyether diol and a diisocyanate.

6. The silicon-containing resin composition of claim 1 wherein the silylated resin is a silylated polyurethane obtained from the reaction of hydroxyl-terminated polyether polyol and isocyanatosilane.

7. The silicon-containing resin composition of claim 1 wherein the silylated resin is a silylated polyurethane obtained from the reaction of an isocyanato-terminated polyether polyol and aminosilane.

8. The silicon-containing resin composition of claim 1 wherein the diorganopolysiloxane has the general formula:

$$M_a D_b D'_c$$

wherein subscript a=2 and b is equal to or greater than 1 and subscript c is zero or positive;

$$M=(HO)_{3-x-y}R^7_x R^8_y SiO_{1/2};$$

wherein x equals 0, 1 or 2, y is either 0 or 1, with the proviso that x+y is less than or equal to 2, $R^7$ and $R^8$ are independent monovalent hydrocarbon radicals containing from 1 to about 60 carbon atoms;

$$D=R^9 R^{10} SiO_{1/2};$$

$R^9$ and $R^{10}$ are independent monovalent hydrocarbon radicals containing from 1 to about 60 carbon atoms; and, $$D'=R^{11} R^{12} SiO_{2/2};$$

$R^{11}$ and $R^{12}$ are independent monovalent hydrocarbon radicals containing from 1 to about 60 carbon atoms.

9. The silicon-containing composition of claim 1 wherein the condensation and/or crosslinking-facilitating catalyst is at least one selected from the group consisting of metal condensation catalysts and non-metal condensation catalysts.

10. The silicon-containing composition of claim 9 wherein the metal condensation catalyst is at least one selected from the group consisting of tin, titanium, zirconium, lead, iron, cobalt, antimony, manganese, bismuth and zinc compounds.

11. The silicon-containing resin composition of claim 1 wherein the process of obtaining functionalized silica further comprises after step (iii) adding a solvent, thereby forming a suspension comprising said functionalized silica.

12. The silicon-containing resin composition of claim 1 wherein said first organosilicon functionalizing agent comprises an organosilazane, and said functionalized silica-preparing catalyst comprises a base catalyst or a neutral catalyst.

13. The silicon-containing resin composition of claim 12 wherein said organosilazane comprises a hexaalkyldisilazane.

14. The silicon-containing resin composition of claim 12 wherein said functionalized silica-preparing catalyst comprises a base catalyst.

15. The silicon-containing resin composition of claim 13 wherein said hexaalkyldisilazane comprises hexamethyldisilazane.

16. The silicon-containing resin composition of claim 1 wherein said first organosilicon functionalizing agent comprises a halosilane, and said functionalized silica-preparing catalyst is an acid catalyst or a neutral catalyst.

17. The silicon-containing resin composition of claim 1 wherein said second organosilicon functionalizing agent comprises at least one alkenyl group.

18. The silicon-containing resin composition of claim 17 wherein said second organosilicon functionalizing agent comprises a (dialkenyl)disilazane.

19. The silicon-containing resin composition of claim 18 wherein said (dialkenyl)disilazane comprises a dialkenyl(tetraalkyl)disilazane.

20. The silicon-containing resin composition of claim 19 wherein said dialkenyl(tetraalkyl)disilazane comprises divinyl(tetramethyl)disilazane.

21. The silicon-containing resin composition of claim 1 wherein said second organosilicon functionalizing agent comprises a (alkenyl)halosilane, and said functionalized silica-preparing catalyst is an acid catalyst or a neutral catalyst.

22. The silicon-containing resin composition of claim 1 wherein the diorganopolysiloxane is present in an amount ranges from about 5 weight percent to about 95 weight percent of the total composition.

23. The silicon-containing resin composition of claim 1 wherein the diorganopolysiloxane is present in an amount that ranges from about 35 weight percent to about 85 weight percent of the total composition.

24. The silicon-containing resin composition of claim 1 wherein the diorganopolysiloxane is present in an amount that ranges from about 50 weight percent to about 70 weight percent of the total composition.

25. The silicon-containing resin composition of claim 1 wherein the silylated resin is present in an amount that ranges from about 5 weight percent to about 95 weight percent of the total composition.

26. The silicon-containing resin composition of claim 1 wherein the silylated resin is present in an amount that ranges from about 35 weight percent to about 85 weight percent of the total composition.

27. The silicon-containing resin composition of claim 1 wherein the functionalized silica is present in an amount that ranges from about 5 to about 80 parts by weight per 100 parts by weight of the total silicon-containing resin composition.

28. The silicon-containing resin composition of claim 1 wherein the functionalized silica is present in an amount that ranges from about 10 to about 30 parts by weight per 100 parts by weight of the total silicon-containing resin composition.

29. The cured composition of claim 1.

30. The cured composition of claim 29 wherein the transmittance of a sheet of the cured composition made as per ASTM test D412 is greater than 40 percent.

31. The cured composition of claim 29 wherein the transmittance of a sheet of the cured composition made as per ASTM test D412 is greater than 60 percent.

32. A sealant comprising the silicon-containing resin composition of claim 1.

33. An adhesive comprising the silicon-containing resin composition of claim 1.

34. A cured composition resulting from the curing of the moisture curable silicon-containing resin composition of claim 1, which moisture curable silicon-containing resin composition is made by the process comprising combining the functionalized sol gel silica with at least one silicon-containing resin selected from the group consisting of a diorganopolysiloxane wherein the silicon atom at each polymer chain end of said diorganopolysiloxane is silanol terminated, and a silylated resin.

35. A sealant comprising the cured composition of claim 33, wherein a sheet of said sealant has a primerless adhesive lap shear strength of at least about 77 psi and a cohesive failure of 100% as measured by WPSTM Test C-1221 on vinyl-glass test panels.

36. An adhesive comprising the cured composition of claim 33.

37. The silicon-containing resin composition of claim 1 wherein the functionalized sol gel silica has a mean particle size of from about 80 nm to about 120 nm and a BET surface area of from about 100 $m^2/g$ to about 1,000 $m^2/g$.

* * * * *